Dec. 8, 1959 L. CRANDALL 2,916,006
AMPHIBIAN VEHICLE
Filed Oct. 17, 1955 2 Sheets-Sheet 1
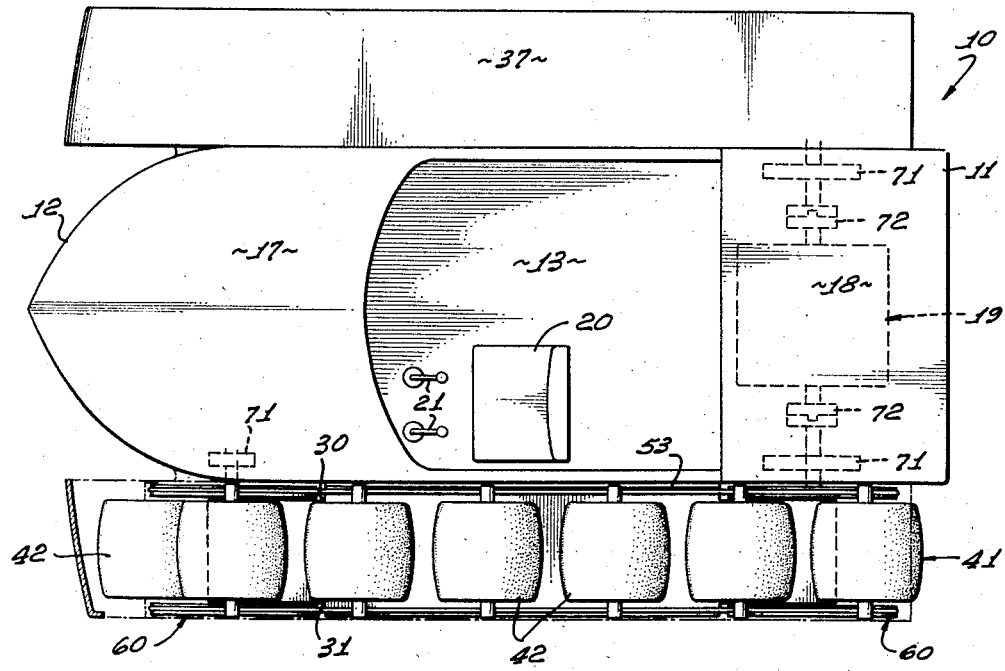
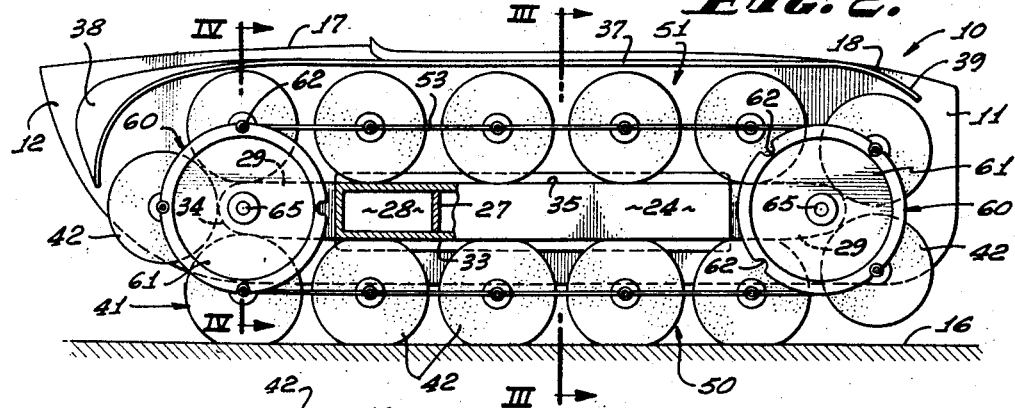
INVENTOR.
LOID CRANDALL
BY
ATTORNEY.

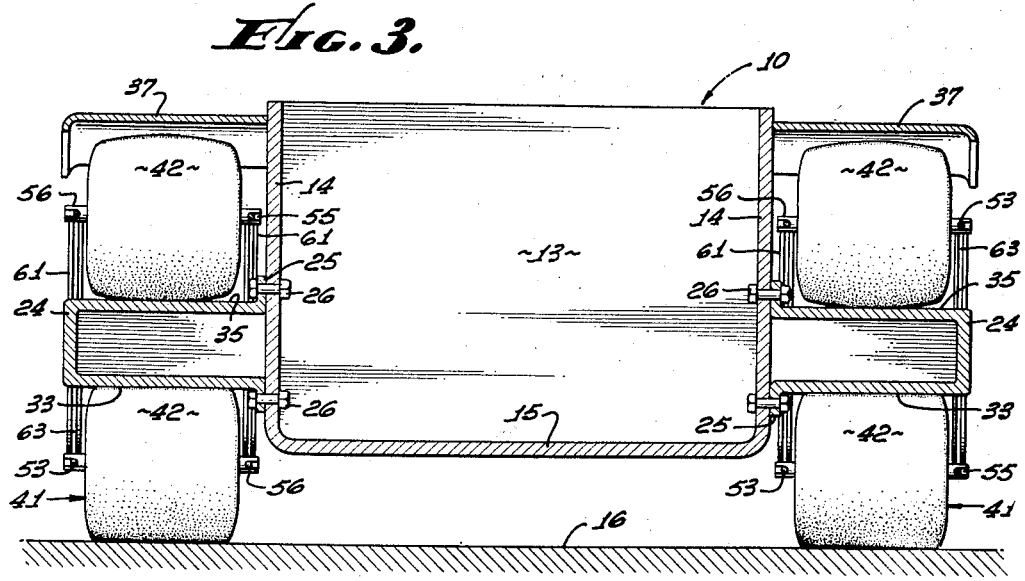
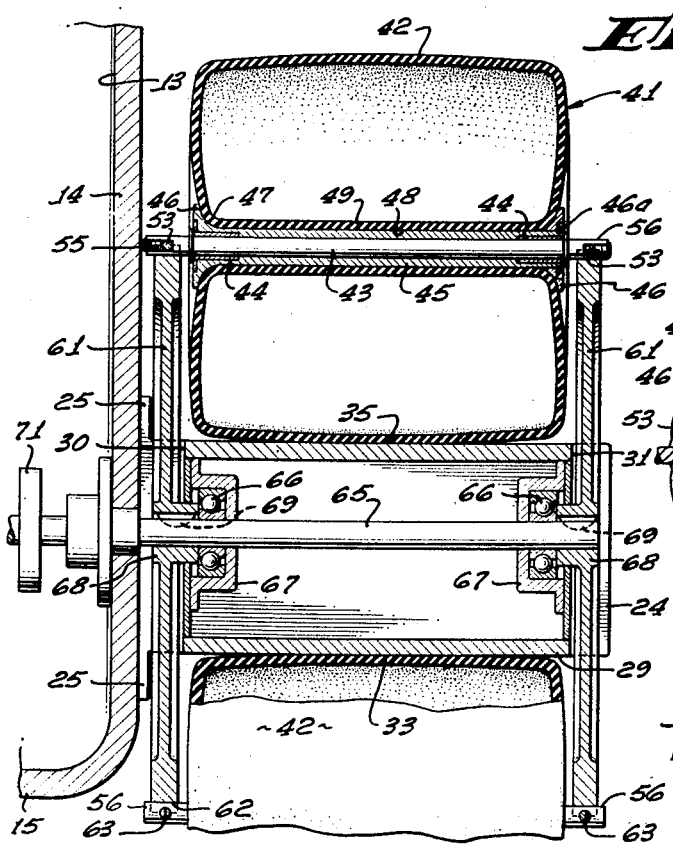
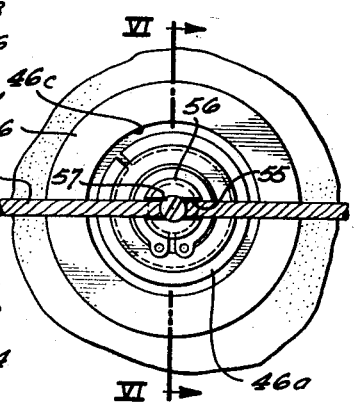

United States Patent Office 2,916,006
Patented Dec. 8, 1959

2,916,006

AMPHIBIAN VEHICLE

Loid Crandall, Alhambra, Calif.

Application October 17, 1955, Serial No. 540,819

3 Claims. (Cl. 115—1)

This invention relates to an amphibian vehicle, and more particularly to a transport carrier for cargo or personnel which is supported and propelled in a novel manner and which is capable of facile movement over impassable, adverse types of terrain and reefs.

Numerous types of amphibian vehicles have been heretofore proposed for transporting cargo and personnel over land and water. More recent amphibian vehicles have employed low-pressure pneumatic tires of watermelon-like balloons to absorb travel shock by conforming to surface irregularities and yielding to, instead of resisting, such irregularities. Such elongate balloon tires have been driven in various manners, such as the standard, well-known method of driving through axles supporting the tires and by driving tubular steel rollers which frictionally contact top surfaces of said tires in order to impart rotation thereto. In each of the prior amphibian vehicles constructed as above, the vehicle body has been supported by adaptations of well-known axle assemblies and truck arrangements in which the supported load is carried by the axles extending through the tires.

The present invention embodies a new concept of supporting and propelling a vehicle body so as to achieve new advantages and immensely improved performance on land and on water. The present invention contemplates an amphibian vehicle or transport carrier which is capable of movement over rough and rocky terrain, soft and unstable ground, through sand, snow, marsh, ice and swamps, up steep inclines and over reefs and beaches. The present transport carrier is exceptionally well adapted for military and for exploratory service.

Generally speaking, the present invention contemplates a vehicle or carrier body for cargo or personnel which is provided at each side thereof with an outwardly extending carrier portion providing a longitudinal, downwardly facing, non-skid support surface. The support surface of each carrier portion rests upon a bottom lay of an endless means constructed of a plurality of low-pressure, cylindrical, freely rotatable pneumatic roller tires or bags, the upper lay of said endless means passing over said carrier portions. The endless means are cooperably associated with longitudinally spaced sprocket means carried by the body at opposite ends of said longitudinal support surface. Drive means are provided for said sprocket means whereby rotation of said sprocket means will cause the vehicle body to be propelled along the bottom lay of the roller bag and at the same time circulate said roller bags so as to provide continuous advancing support for said vehicle body. The novel manner of supporting the vehicle body and propelling the body may be likened to supporting a body to be moved upon a plurality of freely rotatable rollers so that as a force is applied to the body in the direction of desired movement, the body will roll along the top surfaces of the rollers. In the present invention the driving force is preferably located at the rear sprocket means so that upon rotation of the sprocket means a pulling force is exerted on the bottom lay of the endless means while at the same time the sprocket means and body associated therewith is propelled forwardly over the roller means.

It is therefore the primary object of this invention to disclose a novel amphibian vehicle or transport carrier.

An object of this invention is to disclose a transport carrier having a body for cargo or personnel supported in a novel manner for movement.

Another object of this invention is to disclose and provide a transport carrier including a body supported in novel manner and driven and propelled by endless means which support the body along its length.

A further object of this invention is to disclose and provide an amphibian vehicle in which the endless means for propelling a carrier body are arranged to include a bottom lay of soft low pressure pneumatic roller bags which support said body along the top surfaces of the bottom lay.

A further object of the invention is to disclose and provide a novel means for driving and propelling such an amphibian vehicle.

These and many other objects of this invention will be readily apparent to those skilled in the art from the following description of the drawings in which an exemplary embodiment is shown.

In the drawings:

Fig. 1 is a top view of an amphibian vehicle embodying this invention, a part of the left body fender being broken away.

Fig. 2 is a side view of Fig. 1, partly in section.

Fig. 3 is a transverse vertical sectional view taken in the plane indicated by line III—III of Fig. 2.

Fig. 4 is an enlarged transverse vertical sectional view taken in the plane indicated by line IV—IV of Fig. 2.

Fig. 5 is an enlarged fragmentary view illustrating an exemplary connection between a flexible cable and an axle of a roller means employed in this amphibian vehicle.

Fig. 6 is a sectional view taken in the plane indicated by line VI—VI of Fig. 5.

In the exemplary embodiment of this invention shown in the drawings, an amphibian vehicle or transport carrier generally indicated at 10 may be provided with a vehicle or carrier body 11 shaped at one end 12 to provide a pointed bow for facilitating movement of the vehicle in water. The shape of body 11 may be changed to meet various requirements for the transport of cargo, personnel or other things. The exemplary vehicle body 11 provides a hollow, water-tight compartment 13 of suitable shape and may be equipped as desired.

The vehicle body 11 includes side walls 14 connected by a bottom wall 15 supported a selected distance above a ground surface 16. At front end 12 of the body may be provided a front deck 17 and at the back end of the body may be provided a rear deck 18 serving to cover and protect a motor and transmission means generally indicated at 19. Suitably positioned within compartment 13 may be a driver's seat 20 and vehicle control means are generally indicated at 21.

Vehicle body 11 also includes longitudinal carrier portions 24 each extending outwardly from a side wall 14. Carrier portions 24 may each include a generally horizontally disposed, hollow, U-shaped section, the legs of the U being provided with outwardly turned flanges 25 for connecting carrier portion 24 to side wall 14 by means of longitudinally spaced bolt and nut assemblies 26. The hollow carrier portions may be compartmented by suitable partition walls 27 so as to provide a plurality of independent tanks 28 for holding gasoline or other liquids. The longitudinal carrier portions 24 extend generally parallel to ground surface 16 for a major portion of the length of the vehicle body. Carrier portions 24 are provided with forwardly and rearwardly directed reduced end sections 29 spaced from side walls 14 and providing inboard recesses 30 and outboard recesses 31.

Each carrier portion 24 provides a bottom, longitudinal, non-skid downwardly facing body support frictional surface 33 of selected width. The support surface 33 extends to and includes end sections 29 and at sections 29 may be curved upwardly as at 34 in selected manner. The illustrated upwardly directed curve includes a gentle incline terminating in substantially a radius. It is understood that the support surface 33 may include other curved forms and that such curvature may be varied so as to provide a selectively contoured bottom support surface 33. Each carrier portion 24 also provides a top surface 35 extending in a virtually parallel spaced relation to bottom surface 33. The top surface 35 may be of any selected configuration.

It may be noted that the vehicle body 11 also includes sidewardly extending longitudinal fenders 37 which are spaced above top surface 35 and overhang carrier portions 24. Each fender 37 may be curved downwardly at its front end 38 and may be slightly curved downwardly at its rear end 39.

Means to support and propel the vehicle body 11 may include a pair of endless roller means generally indicated at 41 arranged longitudinally at each side of the body. Each endless means 41 may comprise a plurality of cylindrical pneumatic roller means or bags 42, each roller bag 42 being inflated to relatively low pressure and having a selected diameter and length. Each roller bag 42 is antifrictionally mounted for free rotation on an axle assembly including a non-rotatable through axle 43 mounted in sleeve bearings 44 carried by a rotatable hollow axle sleeve 45. It is understood that other types of bearing means may be used in place of sleeve bearings 44. The axle sleeve 45 may be provided at each end with an enlarged, outwardly flared flange 46 providing a curved inner surface 47. Outer flange 46 may be removably sleeved over and secured to axle sleeve 45 by a releasable lock or snap ring 46a in engagement with a groove 46b in axle sleeve 45 and seated against the bottom wall of recess 46c in flange 46. Each roller bag 42 includes a central bore 48 which is formed by an inner cylindrical wall 49 and which is adapted to snugly receive axle sleeve 45. Upon inflation of roller bag 42, the inner cylindrical wall 49 is pressed against the outer surface of the axle sleeve 45 for securing the bag to the axle assembly. End flanges 46 prevent axial displacement of the bag 42.

The endless means 41 of roller bags 42 are arranged so as to provide a bottom lay 50 which extends beneath each carrier portion 24 and rollingly engages and contacts the bottom support surface 33 on said carrier portion. As seen in Fig. 2, the bottom lay 50 includes at least five roller bags 42 disposed in contact with support surface 33. Each roller bag 42 may be provided with a relatively smooth, uninterrupted outer surface for frictional contact with support surface 33 and the ground surface over a preselected area. Load pressure per unit area, where roller bags 42 are inflated, is predetermined to provide desired floatation of the vehicle on unstable soils such as sand, swamps, mud, and the like. It is understood that the number of bags disposed for contact with surface 33 may be varied, depending upon the weight, size and cargo-carrying capacity desired for the transport carrier.

In this example an upper lay 51 is provided which extends in spaced-apart generally parallel relation to bottom lay 50; the roller bags of the top lay 51 may rollingly contact the top surface 35.

Each roller bag 42 of each endless means is interconnected with the adjacent roller bag by means of a pair of flexible endless cables 53. Each cable 53 may be made of any suitable relatively non-stretchable wire or steel-stranded cable. Each cable 53 may be received within an axial end slot 55 provided in each stationary axle end portion 56 at opposite ends of non-rotatable axle 43. Each cable 53 may be secured in said end slot by a set screw 57 threaded in an enlarged bore 58 of end slot 55 and having an inner end pressed against said cable. It is understood that other suitable means may be employed for connecting cable 53 to the non-rotatable axles 43 of the roller bags 42.

Each endless means 41 may be carried and driven through a pair of sprocket means 60 disposed in recesses 30 and 31 at opposite ends of carrier portions 24. Each sprocket means includes a pair of sprocket disks 61 spaced apart to freely receive therebetween roller bags 42. The outer circumferential margins of sprocket disks 61 may be provided with aligned notches or recesses 62 circumferentially spaced apart a distance equal to the linear spacing apart of axles 43 of adjacent roller bags to releasably receive and interlockingly engage axle end portions 56. The outer circumferential edge of each sprocket disk 61 is provided with a circumferential groove 63 to receive and guide the associated cable 53.

In this example, each pair of sprocket disks 61 may be carried by a rotatable shaft 65 mounted in spaced antifriction bearing means 66 carried in bearing housings 67 mounted within end sections 29 of carrier portions 24. Hubs 68 on sprocket wheels 61 may be keyed as at 69 to shaft 65 for rotation therewith. Each shaft 65 may extend inwardly through side wall 14 in a suitable water-tight fitting (not described in detail) for connection to a brake means 71 diagrammatically indicated.

Each brake means 71 may be of suitable well known friction type, and brake means 71 on one side of the vehicle 10 may be cooperably interconnected for operation independently of brake means 71 on the other side of the vehicle to permit control and maneuvering of the vehicle.

At the rear of the vehicle, each shaft 65 extends inwardly beyond its associated brake means 71 to a selectively operable clutch means diagrammatically indicated at 72. Clutch means 72 are connected to the motor and transmission means 19 and are independently, selectively engageable so that the endless roller means 41 on each side of the vehicle may be independently driven.

Lateral play of the bottom lay 50 between sprocket means 60 is limited by the parallel spaced-apart flexible cables 53. It will be apparent that the flexible interconnection of adjacent roller bags 42 will permit some lateral displacement of said roller bags due to lateral or transverse forces, but that the roller bags in the bottom lay will not be displaced sufficiently from engagement with the relatively wide support surfaces 33. It may be noted that such lateral or transverse misalignment of roller bags between sprocket means 60 will not affect operation of the vehicle because each roller bag is an idle or freely rotatable bag and will continue to support the vehicle.

When the vehicle 10 is immobile or at rest, it should be particularly noted that the vehicle body is supported on the top surfaces of the idle, freely rotatable roller bags 42 of the bottom lay 50. The roller bags are selectively uniformly inflated so as to provide a selected load pressure per unit of area on ground surface 16, and frictional contact exists between the outer surface of the roller bags and the support surface 33 and ground surface 16. The top lay 51 is in effect inoperative, but provides an endless supply of idle, freely rotatable roller bags 42 which may be fed to the bottom lay when the vehicle is in motion as by circulation of said endless means.

In starting the vehicle, torque is applied to rear shafts 65 by means of the motor and transmission means 19 and clutches 72. As viewed in Fig. 2, sprocket means 60 are rotated in a counterclockwise direction for advancement of the vehicle to the front. Counterclockwise rotation of sprocket means 60 produces a pulling force on the flexible cables 53 of the bottom lays and at the same time produces a forwardly directed opposing thrust force on the vehicle body which tends to advance the vehicle body along the top surfaces of the idle, freely rotatable roller bags 42 of the bottom lay. Advancement or motion is transmitted to the body relative to the ground surface because of frictional contact between the ground surface and the bottom porions of the roller bags of the bottom lay and frictional contact between the top portion of the roller bags and the bottom surface 33 on the carrier portion. It should be noted that the weight of the vehicle body is not carried by the anxles 43 of the roller bags but the weight is supported on the peripheral surfaces of the roller bags of the bottom lay. To positively insure that the weight of the vehicle is not borne by axles 43 even at their point of engagement with the sprocket wheels, it should again be noted that end sections 29 are curved slightly upwardly. Moreover, as shown in Fig. 4, the axis 65 of the sprocket wheels is unsymmetrically spaced with respect to the surfaces 33 and 35 on the carrier portion, the greater space being between the bottom surface 33 and axis 65. Positive frictional engagement of the roller bags with the ground surface and with the bottom surface 33 is thus provided. As the vehicle body thus advances on the bottom lay 50, endless means 41 are continuously circulated about the carrier portions 24 in order to continuously provide idle roller bags 42 at the front end of the advancing vehicle. Thus, the vehicle body is advanced in a manner similar to advancement over a plurality of idle rollers.

It should be noted that such support and propelling of a vehicle facilitates rapid movement of the vehicle because for each revolution of a roller bag the vehicle body is advanced, relative to the ground, twice the linear distance measured by the circumference of the roller bag. Thus, it is possible for the vehicle of the present invention to achieve relatively high speeds with only relatively low revolutions per minute of the idle, freely rotatable roller bags 42.

In movement, it will be readily apparent that the roller bags 42 will yield to irregularities in the ground surface instead of resisting such irregularities. In fact, irregularities in the ground surface improve frictional contact therewith and therefore render the propelling means of this invention more effective. When relatively steep inclines or large objects obstruct the advancement of vehicle 10, it has been found that the roller bags 42 disposed in interlocking engagement with the sprocket means 60 at the front of the vehicle tend to climbingly engage such incline or obstruction so as to easily and effectively advance the vehicle over the obstruction or up the incline. Relatively high obstructions placed in the path of a vehicle embodying this invention have been readily surmounted.

In water, the amphibian vehicle of this invention is capable of facile movement since circulation of the endless roller bag means 41 provides, in effect, side paddle wheels, each roller bag of the bottom lay presenting an effective pressure area to water for exerting a pressure force against the water to advance the vehicle. Maneuverability in the water is readily provided by changing the rate of speed of endless means 41 on the side of the vehicle as compared to the other side. If desired, suitable rudder means (not shown) may be attached to the stern of the vehicle in order to facilitate guiding and steering the vehicle. In water, the waterline may be generally located at about the carrier portions 24. It is understood that the hollow, water-tight vehicle body, together with the inflatable roller bags 42, provides the necessary flotation of the vehicle.

It will be thus readily understood by those skilled in the art that an improved amphibian vehicle embodying a novel manner of body support and propelling means is afforded by the vehicle described above. It is understood that numerous changes and modifications may be made in the construction of the vehicle body, the positioning of the carrier portions, the contour of the support surface on the carrier portions, and the width, number, and inflation of the pneumatic roller bags 42. It is also understood that while drive means have been illustrated for applying torque to the rear sprocket means 60, that torque may simultaneously be applied through suitable well-known drive arrangements to front shafts 65 so that both front and rear sprocket means may be driven.

It should be noted that the manner of mounting the bags on the axle assemblies permits quick easy removal thereof when damaged or replacement is required. After the cable has been disconnected from the axle extension 56, outer flange 46 may be removed and the tire bag 42 deflated and slipped endwise off axle 45. Another bag 42 may then be placed on axle 45 and flange 46 assembled therewith. Deflation of several bags in the bottom lay will not render the vehicle completely inoperative.

All changes and modifications coming within the scope of the appended claims are embraced thereby.

I claim:

1. Means for supporting and imparting movement to a carrier body upon a ground surface comprising in combination: a pair of laterally spaced endless roller means, each roller means including a plurality of low-pressure, pneumatic, freely-rotatable rollers, each roller being provided with a non-rotatable axle having axle-end portions projecting outwardly from its associated roller; a pair of flexible endless cables, each cable interconecting respective axle-end portions at one side of said roller means; a carrier body supported between said pair of spaced endless roller means and provided with a downwardly-facing planar longitudinally and laterally uninterrupted surface at each side of the body, said downwardly-facing surface bearing in frictional contact upon top portions of the bottom lay of the roller means, bottom portions of the bottom lay having frictional contact with said ground surface; drive means carried by the carrier body and including a pair of sprocket means for each endless roller means, said sprocket means being positioned to interengage with said axle-end portions at each side of the associated endless roller means to exert a pulling force along the axles of the bottom lay whereby frictional contact of the rollers of the bottom lay with said ground surface and with said downwardly facing surface transmits motion to said carrier body.

2. A means as claimed in claim 1 wherein said carrier body includes an upwardly facing surface spaced above said downwardly facing surface, and wherein said sprocket means have axes unsymmetrically disposed with respect to said upwardly and downwardly facing surfaces on said carrier body.

3. Means for supporting and imparting movement to a carrier body upon a ground surface comprising in combination: a pair of laterally spaced endless roller means, each roller means including a plurality of low pressure pneumatic freely rotatable rollers, each roller having non-rotatable axle end portions projecting outwardly from its associated roller; a pair of flexible endless cables, each cable interconnecting respective axle end portions at one side of said roller means; a carrier body supported between said pair of spaced endless roller means and provided with longitudinal carrier body portions extending laterally outwardly and between top and bottom lays of the pair of endless roller means, each carrier body portion having a downwardly facing surface bearing in frictional contact upon top portions of the bottom lay of the endless roller means, bottom portions of the said bottom lay having frictional contact with said ground surface; drive means carried between carrier body and including a pair of sprocket means for each endless roller means, said sprocket means being positioned to interengage with said axle end portions at each side of the associated endless roller means to exert a pulling force along the axle end portions of the bottom lay whereby frictional contact of the rollers of the bottom lay with said ground surface and with said downwardly facing surface transmits motion to said carrier body.

References Cited in the file of this patent

UNITED STATES PATENTS

| | | |
|---|---|---|
| 328,559 | Baker | Oct. 20, 1885 |
| 813,648 | Horton | Feb. 27, 1906 |
| 2,463,121 | Sapp | Mar. 1, 1949 |
| 2,734,476 | Marsh | Feb. 14, 1956 |

FOREIGN PATENTS

| | | |
|---|---|---|
| 532,597 | Germany | Aug. 31, 1931 |